United States Patent
King (10) Patent No.: US 12,072,241 B2
(45) Date of Patent: Aug. 27, 2024

(54) SPATIAL LIGHT MODULATOR SPECTROSCOPY

(71) Applicant: Texas Instruments Incorporated, Dallas, TX (US)

(72) Inventor: Philip Scott King, Mineola, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 421 days.

(21) Appl. No.: 17/180,109

(22) Filed: Feb. 19, 2021

(65) Prior Publication Data

US 2021/0172796 A1 Jun. 10, 2021

Related U.S. Application Data (62) Division of application No. 15/824,868, filed on Nov. 28, 2017, now Pat. No. 10,969,277.

(51) Int. Cl.
*G01J 3/28* (2006.01)
*G01J 3/02* (2006.01)
*G01J 3/10* (2006.01)

(52) U.S. Cl.
CPC .............. *G01J 3/28* (2013.01); *G01J 3/021* (2013.01); *G01J 3/0229* (2013.01); *G01J 3/027* (2013.01);
(Continued)

(58) Field of Classification Search
CPC .. G01J 2003/2866; G01J 3/021; G01J 3/0229; G01J 3/027; G01J 3/10;
(Continued)

(56) References Cited

U.S. PATENT DOCUMENTS 6,859,275 B2 2/2005 Fateley et al.
6,996,292 B1 2/2006 Gentry et al.
(Continued)

FOREIGN PATENT DOCUMENTS

EP 0548830 A1 6/1993

OTHER PUBLICATIONS

Opteks LLC, "Spectroscopy: DLP NIRscan Nano Spectrometer" Internet Article, (2014-2106) Opteks LLC, 4502 E. 41st Street, 4W138, Tulsa, OK 74135 USA.
(Continued)

*Primary Examiner* — Sunghee Y Gray
(74) *Attorney, Agent, or Firm* — Michelle F. Murray; Frank D. Cimino (57) ABSTRACT

In described examples, a spatial light modulator includes groups of pixels. Each group is arranged to transmit only a respective portion of a light spectrum. The respective portion has a respective dominant color. The respective portions of the light spectrum are distinct from one another, according to their respective dominant colors. Each group is controlled by a respective reset signal. The spatial light modulator is coupled to receive a selection from the integrated circuit and in response to the selection: cause a selected one of the groups to transmit its respective portion of the light spectrum; and cause an unselected one of the groups to block transmission of its respective portion of the light spectrum. A photodetector is coupled to: receive the respective portion of the light spectrum transmitted by the selected group; and output a signal indicating an intensity thereof.

19 Claims, 9 Drawing Sheets

(52) U.S. Cl.
CPC ......... *G01J 3/10* (2013.01); *G01J 2003/2866* (2013.01); *G01N 2201/0675* (2013.01)

(58) Field of Classification Search
CPC ...... G01J 3/28; G01J 2003/102; G01J 3/0208; G01J 3/18; G01J 3/32; G01J 3/42; G01N 2201/0675
USPC .......................................................... 356/451
See application file for complete search history.

(56) References Cited

U.S. PATENT DOCUMENTS

| | | |
|---|---|---|
| 8,120,281 B2 | 2/2012 | Reuter |
| 8,305,575 B1 | 11/2012 | Goldstein et al. |
| 8,488,229 B2 | 7/2013 | Hotta |
| 9,344,694 B2* | 5/2016 | Hui ...................... H04N 9/3123 |
| 9,584,800 B2* | 2/2017 | Beck ...................... H04N 25/68 |
| 2003/0123120 A1 | 7/2003 | Hewlett et al. |
| 2004/0218172 A1 | 11/2004 | DeVerse et al. |
| 2008/0246891 A1 | 10/2008 | Russell et al. |
| 2009/0153590 A1 | 6/2009 | Hewlett et al. |
| 2010/0309467 A1 | 12/2010 | Fox et al. |
| 2011/0013056 A1* | 1/2011 | Myhrvold ............ H04N 25/135 348/E5.045 |
| 2013/0222403 A1 | 8/2013 | Clatanoff et al. |
| 2015/0293308 A1 | 10/2015 | Blanche et al. |
| 2017/0052324 A1 | 2/2017 | Blanche et al. |
| 2018/0088347 A1 | 3/2018 | Van Der Zouw et al. |

OTHER PUBLICATIONS

Nelson, "DLP® Technology for Spectroscopy" White Paper, DLPA048A—Feb. 2014—Revised Aug. 2016 Texas Instruments Incorporated, 12500 TI Blvd., Post Office Box 655303, Dallas, Texas 75265 USA.

* cited by examiner

SPATIAL LIGHT MODULATOR SPECTROSCOPY

This application is a divisional application of U.S. patent application Ser. No. 15/824,868 filed on Nov. 28, 2017, entitled "Spatial Light Modulator Spectroscopy," which Applications is hereby incorporated herein by reference in its entirety.

This relates generally to spectroscopy, and more particularly to spatial light modulator spectroscopy.

TECHNICAL FIELD

Background

Spectroscopy is a technique used by science and industry to determine the composition of materials. A spectroscope shines a broad spectrum of electromagnetic energy, such as light, on or through a test object. After passing through or reflecting off the test object, a diffraction grating or prism divides the light into its constituent frequencies. The spectroscope measures the intensity of these constituent frequencies. The test object will absorb or resonate certain frequencies of the electromagnetic energy due to the physical structure of the elements and molecules in the test object. Thus, a graph of the measured energy versus the frequency of the measured energy will have peaks and valleys that are characteristic of materials in the test object. Therefore, such a graph indicates the composition of the test object.

One type of spectroscope uses a spatial light modulator (SLM). One type of SLM is a digital micromirror device (DMD). DMDs can have thousands or millions of addressable mirrors in a planar array. To measure a constituent frequency, the prism or diffraction grating directs the spectrum onto the DMD. The different mirrors on the DMD array will receive the constituent frequencies of the spectrum. The DMD addresses the mirrors to direct light of a selected frequency onto a detector, such as a photodiode. The detector receives and measures the light. This method repeats for each frequency of interest. However, to accomplish this process, the entire DMD loads data to direct the mirrors of the DMD to turn on (reflect to the detector) or turn off (reflect away from the detector), even though a small portion of the mirrors are involved for each frequency measurement.

SUMMARY

In described examples, a spatial light modulator includes groups of pixels. Each group is arranged to transmit only a respective portion of a light spectrum. The respective portion has a respective dominant color. The respective portions of the light spectrum are distinct from one another, according to their respective dominant colors. Each group is controlled by a respective reset signal. The spatial light modulator is coupled to receive a selection from the integrated circuit and in response to the selection: cause a selected one of the groups to transmit its respective portion of the light spectrum; and cause an unselected one of the groups to block transmission of its respective portion of the light spectrum. A photodetector is coupled to: receive the respective portion of the light spectrum transmitted by the selected group; and output a signal indicating an intensity thereof.

DETAILED DESCRIPTION

Corresponding numerals and symbols in the different figures generally refer to corresponding parts unless otherwise indicated. The drawings are not necessarily drawn to scale.

The term "coupled" may include connections made with intervening elements, and additional elements and various connections may exist between any elements that are "coupled."

Figure 1:
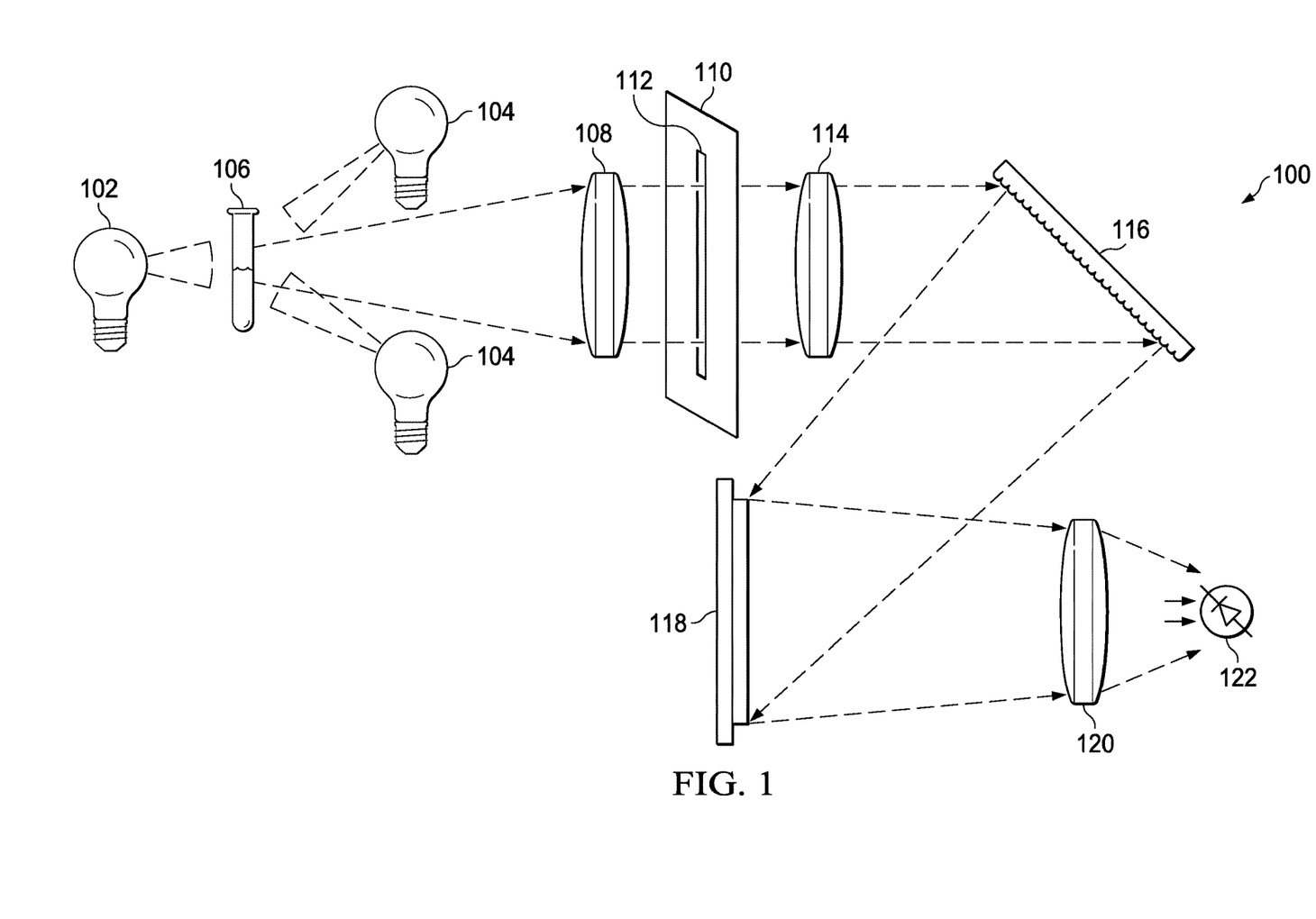
FIG. 1 is a schematic diagram of an SLM-based spectroscope.

FIG. 1 is a schematic diagram of an SLM-based spectroscope. Spectroscope 100 includes light sources 102 or 104 that shine a broad spectrum of electromagnetic energy through or onto test object 106. Light sources 102 and 104 can provide visible, ultraviolet, or infrared light. In addition, the spectrum of light provided by light sources 102 or 104 can bridge these types of light. After the light reflects from or traverses the test object 106, lens 108 collimates the light from test object 106. When figures of this application depict one lens, that lens can be implemented by a system of lenses. For example, FIG. 1 depicts lens 108 as one lens. However, lens 108 can include several lenses. After collimation, the light passes through slit 112 in plate 110. Slit 112 orients the light in one direction. Example widths of slit 112 are 5μ to 100μ. Slit 112 also causes the light to diverge, so it is necessary for lens 114 to re-collimate the light. Diffraction grating 116 then divides the light from slit 112 spectrally, as described more fully hereinbelow. Diffraction grating 116 directs the spectrum from diffraction grating 116 to spatial light modulator (SLM) 118. In this example, SLM 118 is a digital micromirror device (DMD). SLM 118 selectively reflects a portion of the spectrum to photodetector 122 via lens 120. The selection of a portion of the spectrum is more fully explained hereinbelow.

Figures 2, 3, 4:
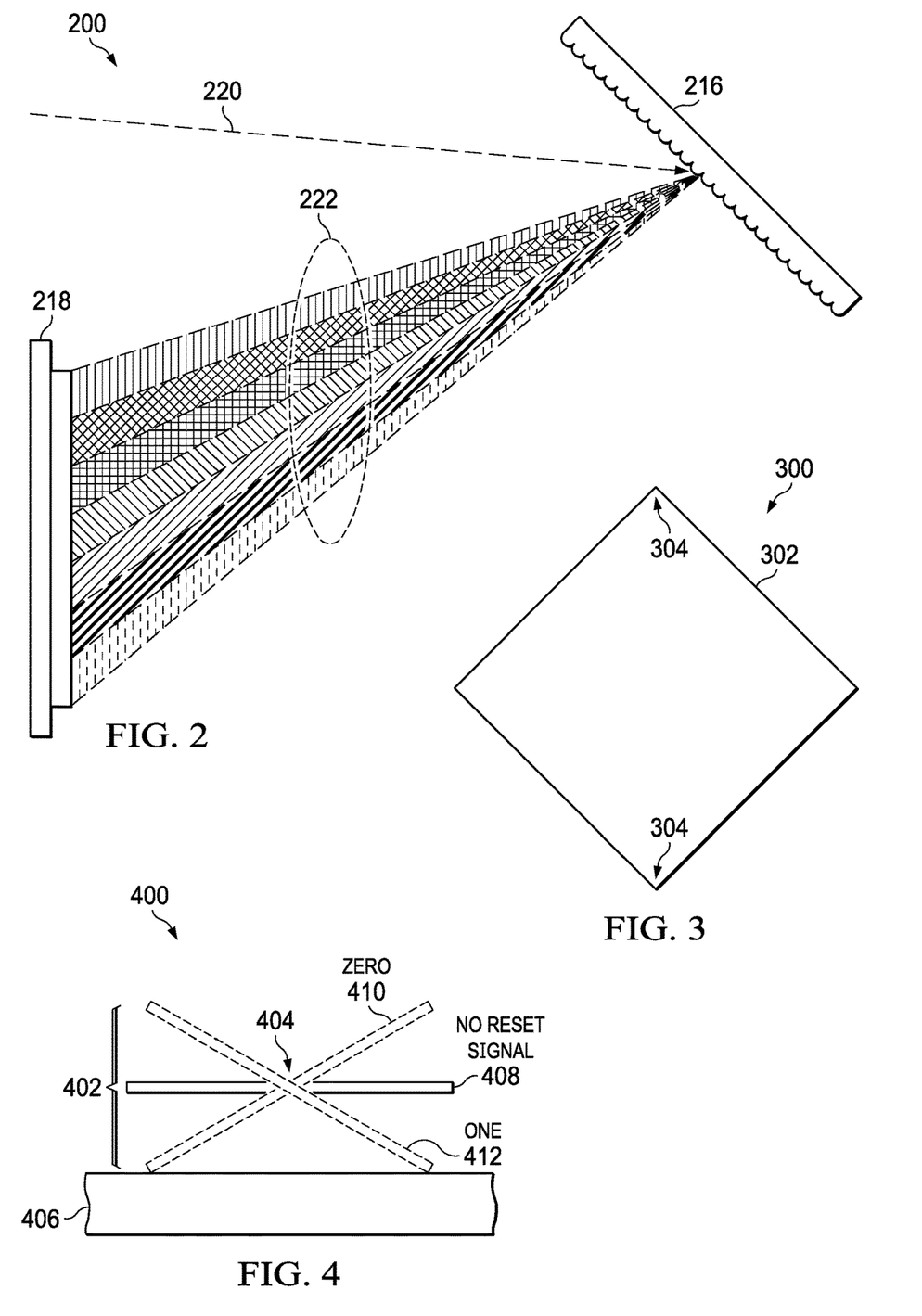
FIG. 2 is a schematic diagram of a portion of an SLM based spectroscope like that of FIG. 1.
FIG. 3 is a view of one mirror of a DMD as seen from the reflecting surface of the DMD.
FIG. 4 is a side view of a mirror like that of FIG. 3.

FIG. 2 is a schematic diagram of a portion of an SLM based spectroscope like that of FIG. 1. Sub-unit 200 includes diffraction grating 216 and SLM 218. Light from a slit, like slit 112 (FIG. 1), reflects off diffraction grating 216. Different frequencies of light reflect at different angles off diffraction grating 216. The angle of reflection follows Equation (1).

$$\sin(\alpha)+\sin(\beta)=m\lambda D 10^{-6} \quad (1)$$

where α is the angle of incidence, β is the angle of reflection, m is a diffraction order, the wavelength λ is in nanometers and the groove density D is in grooves/mm. The result is a spectrum where diffraction grating 216 spreads the light 220 into a spectrum where the angle of reflectance depends on the angle of incidence and the wavelength of the light. The groove density D and the distance from diffraction grating 216 and SLM 218 determines how the spectrum 222 impacts SLM 218. As further explained hereinbelow, by selecting specific micromirrors ("mirrors") on SLM 218, SLM 218 directs specific frequencies of light to photodetector 122 (FIG. 1). This allows for the measurement of specific frequencies of light.

FIG. 3 is a view of one mirror of a DMD as seen from the reflecting surface of the DMD. View 300 shows mirror 302. Mirror 302, in this example, has a square configuration with pivot points 304 at opposing corners of mirror 302.

FIG. 4 is a side view 400 of a mirror 402, such as the mirror 302 of FIG. 3. The corner of mirror 402 has pivot points 404, such as the pivot points 304 of FIG. 3. Pivot connections (not shown) suspend mirror 402 from substrate 406 by pivot points 404. To change the state of mirror 402, a memory cell (not shown) associated with mirror 402 receives and stores a data bit of one or zero. After loading the data bit into the memory cell, a reset signal is applied to all of the DMD's mirrors (or to a subset thereof including the mirror 402), thereby causing mirror 402 to have a "zero" position 410 or a "one" position 412. In absence of the reset signal, mirror 402 is parallel to the surface of substrate 406, as shown by a "no reset signal" position 408. In one of these three positions, such as the one position 412, photodetector 122 (FIG. 1) receives the light reflected off mirror 402. In some examples, light traps capture the light reflected off the mirror in the other positions to avoid corrupting measurement of the desired light signal. A DMD can contain many mirrors like mirror 402. For example, a DMD configured for high definition (HD) television includes 1920×1080 or over two million mirrors. Appropriate selection of mirrors allows for reflection of a very narrow band of light frequencies, as explained further below. However, if a small number of mirrors reflects light to photodetector 122, the low level of light can be difficult to detect. Therefore, the configuration of the number of mirrors for each frequency is a tradeoff between precision and detectability.

Figure 5:
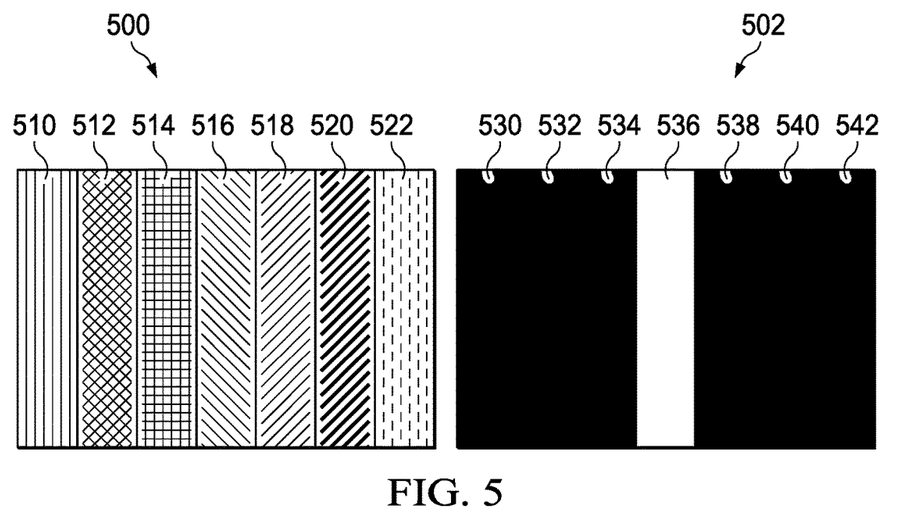
FIG. 5 is a diagram of a spectrum projected onto an SLM and a diagram of an example mirror configuration of the SLM.

FIG. 5 is a diagram of a spectrum projected onto SLM 218 (FIG. 2), and a diagram of an example mirror configuration of the SLM. Because the orientation of slit 112 (FIG. 1) is vertical relative to spectrum 500, the constituent colors of spectrum 500 have a vertical orientation. Spectrum 500 includes red band 510, orange band 512, yellow band 514, green band 516, blue band 518, indigo band 520 and violet band 522. FIG. 5 includes seven bands for simplicity of explanation. An actual spectrum is continuous. In addition, spectrum 500 shows visible light colors. However, example arrangements can use infrared or ultraviolet spectra. SLM pattern 502 shows dark regions 530, 532, 534, 538, 540 and 542. These regions correspond to red band 510, orange band 512, yellow band 514, blue band 518, indigo band 520 and violet band 522, respectively. The dark regions correspond to an SLM configuration that does not reflect the light to photodetector 122 (FIG. 1). In this configuration, light region 536 reflects the light to photodetector 122 (FIG. 1).

Accordingly, for example, the memory cells (not shown) of region 536 store a one while SLM 118 (FIG. 1) is receiving a reset signal. Conversely, the memory cells of regions 530, 532, 534, 538, 540 and 542 store a zero. Therefore, SLM pattern 502 is for measuring the light of green band 516.

Figure 6:
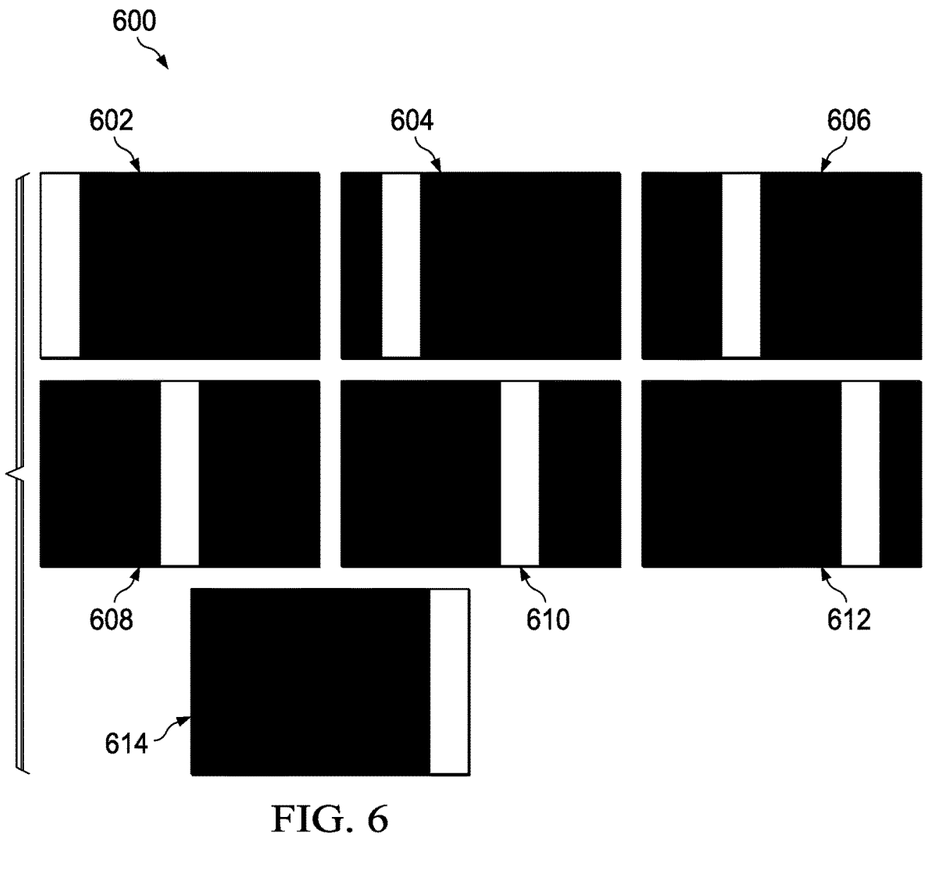
FIG. 6 is a diagram of a series of SLM patterns for measuring the spectrum of light on the SLM.

FIG. 6 is a diagram of a series of SLM patterns for measuring the spectrum of light on the SLM. Pattern group 600 includes seven patterns. SLM pattern 602 allows for measurement of red band 510 (FIG. 5). SLM pattern 604 allows for measurement of orange band 512 (FIG. 5). SLM pattern 606 allows for measurement of yellow band 514 (FIG. 5). SLM pattern 608 allows for measurement of green band 516 (FIG. 5), like SLM pattern 502 (FIG. 5). SLM pattern 610 allows for measurement of blue band 518 (FIG. 5). SLM pattern 612 allows for measurement of indigo band 520 (FIG. 5). SLM pattern 614 allows for measurement of violet band 522 (FIG. 5). Therefore, cycling through each of these SLM patterns allows for measurement of the entire spectrum 500 (FIG. 5). The seven color bands of FIGS. 5 and 6 is a simplification for explanation. More useful measurement uses more precise spectral data, which uses many more bands.

Figure 7:
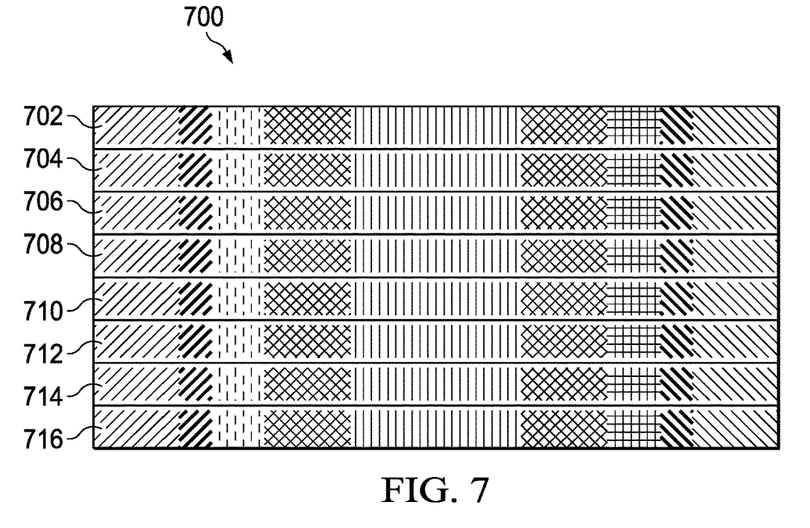
FIG. 7 is a diagram of a spectrum illuminating an SLM that has reset zones.

FIG. 7 is a diagram of a spectrum illuminating an SLM that has reset zones. A reset zone (or group) is a subset of the SLM's pixels (e.g., mirrors). In some examples, the SLM is divided into several reset zones, such as eight or sixteen. SLM 700 includes eight reset groups 702, 704, 706, 708, 710, 712, 714 and 716. Each reset group is controlled by its own respective reset signal, separately from the other reset groups. Accordingly, all of a reset group's mirrors are activated by that reset group's respective reset signal. For example, in response to the reset group's respective reset signal, each mirror in such reset group has either the "zero" position or the "one" position, according to the data bit stored in such mirror's respective associated memory cell. In this example, the spectrum extends from blue to green in the long direction of the SLM. The long direction includes more columns, and thus more pixels per color along the spectrum. For example, an HD-configured SLM is 1920 columns by 1080 rows.

Figure 8:
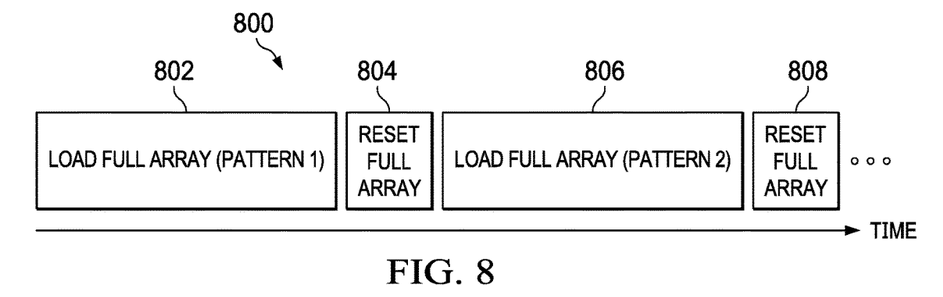
FIG. 8 is a timing diagram of the operation of a spectroscope using the configuration of FIG. 7.

FIG. 8 is a timing diagram 800 of the operation of a spectroscope using the configuration of FIG. 7. Time 802 loads a pattern, for example SLM pattern 602 (FIG. 6), on to the SLM, for example SLM 700 (FIG. 7). The loading of all data for the mirrors occurs during time 802. Therefore, this loading requires a relatively long time. After time 802, SLM 700 (FIG. 7) receives a reset signal during time 804. During this time, the pattern of mirrors SLM 700 (FIG. 7) enables measurement of one frequency band in the spectrum illuminating SLM 700 (FIG. 7). Thus, a measurement of the light impacting photodetector 122 (FIG. 1) taken during time 804 is a measure of the intensity of that one frequency band. Subsequently, time 804 loads a pattern, such as SLM pattern 604 (FIG. 6), onto the SLM, such as SLM 700 (FIG. 7). Thus, photodetector 122 (FIG. 1) measures a different frequency band during time 808. Repeating the method of loading patterns followed by a reset signal provides measurement of the full spectrum or, if desired, a portion of interest.

Figure 9:
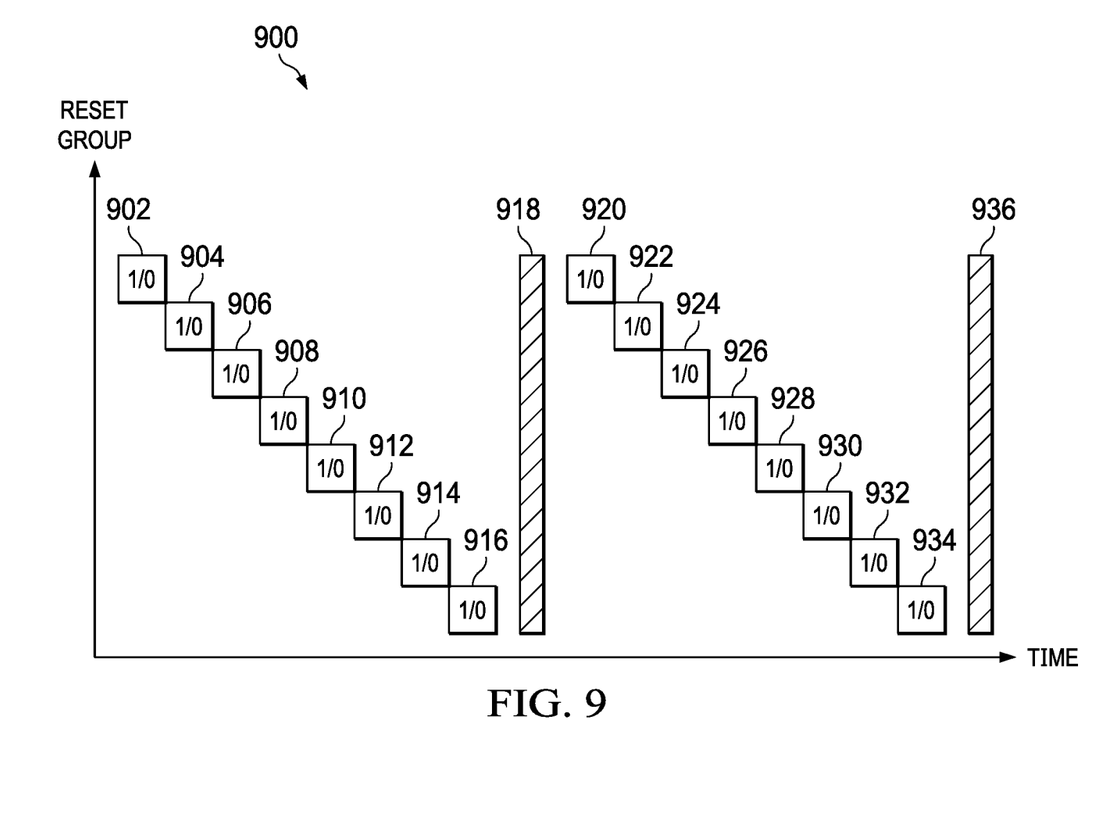
FIG. 9 is a timing chart showing the method described in FIG. 8 in more detail.

FIG. 9 is a timing chart showing the method described in FIG. 8 in more detail. The vertical axis of chart 900 separates the reset groups on example SLM 700 (FIG. 7). For example, a first reset group loads data 902. The second through eighth reset groups subsequently load data 904, 906, 908, 910, 912, 914 and 916, respectively. The time for loading all of data 902, 904, 906, 908, 910, 912, 914 and 916 corresponds to time 802 (FIG. 8). After loading all of data 902, 904, 906, 908, 910, 912, 914 and 916, a reset signal 918 applies the loaded data across all of SLM 700 (FIG. 7). Light measurement occurs during reset signal 918. After reset signal 918, the first through eighth reset groups subsequently load data 920, 922, 924, 926, 928, 930, 932 and 934, respectively. The time for loading all of data 920, 922, 924, 926, 928, 930, 932 and 934 corresponds to time 806 (FIG. 8). After loading all of data 920, 922, 924, 926, 928, 930, 932 and 934, a reset signal 936 applies the loaded data across SLM 700 (FIG. 7).

Figure 10:
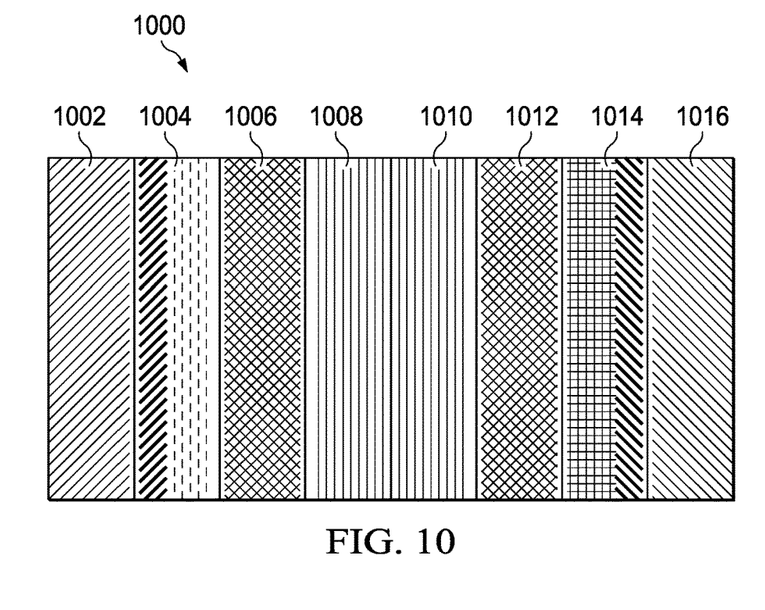
FIG. 10 is a diagram of an example SLM configuration.

FIG. 10 is a diagram of an example SLM configuration. The reset groups of SLM 1000 run perpendicular to the spectrum illuminating SLM 1000, such that each color of the spectrum runs from top to bottom of a reset group (as oriented in FIG. 10). Accordingly, in this example, no color runs across reset groups 1002, 1004, 1006, 1008, 1010, 1012, 1014 and 1016. The colors only occur in one reset group.

Figure 11:
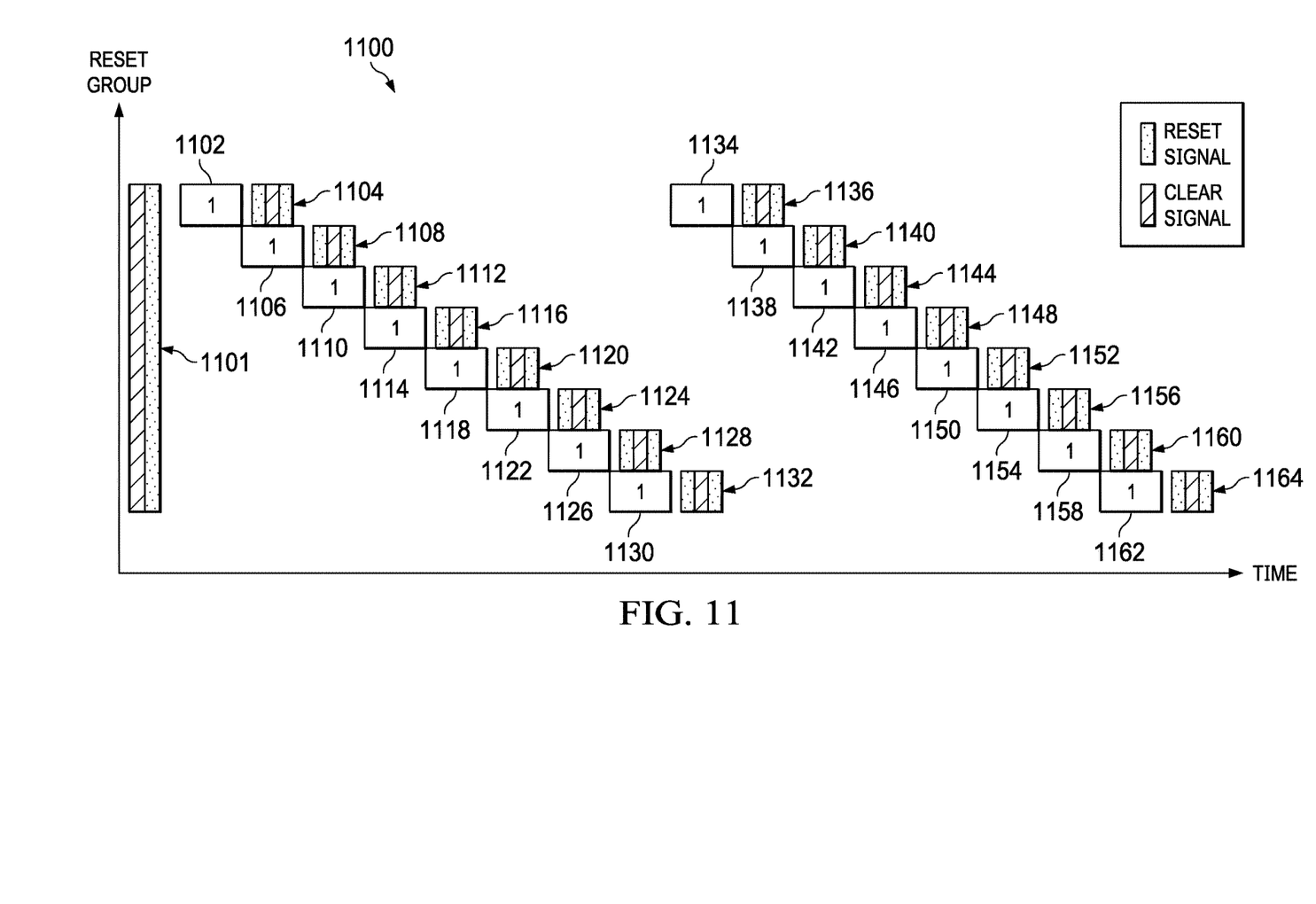
FIG. 11 is a timing diagram of an example method using the configuration of FIG. 10.

FIG. 11 is a timing diagram 1100 of an example method using the configuration of FIG. 10. An initialization signal 1101 including a reset signal and a clear signal clears the entire SLM array. A first reset group loads data 1102 at a first time. After loading data 1102, a compound reset signal 1104 that includes a reset signal followed by a clear signal followed by another reset signal activates the first reset group. The compound reset signal clears the memory for the subsequent data by using a clear signal to quickly write zeros to all the memory cells followed by a reset signal. The clear signal is relatively fast, so it does not require considerable time. A photodetector, such as photodetector 122 (FIG. 1), measures light (impacting the photodetector) corresponding to data 1102 during the first reset signal of compound reset signal 1104, because all pixels of a frequency of interest are within one reset group. While applying compound reset signal 1104 to the first group, the second reset group loads data 1106 followed by compound reset signal 1108. For the third through eighth reset groups, compound reset signals 1112, 1116, 1120, 1124, 1128 and 1132 follow loading of data 1110, 1114, 1118, 1122, 1126 and 1130, respectively. Also, as shown in FIG. 11, the loading of data into a subsequent reset group coincides with the compound reset signal of the previous group. Photodetector 122 takes light intensity measurements during the first reset signal of compound reset signals 1104, 1108, 1112, 1116, 1120, 1124, 1128 and 1132. The time from compound reset signal 1104 to compound reset signal 1132 is on the order of the time of loading data 902 to loading data 916 (FIG. 9). However, during time from compound reset signal 1104 to compound reset signal 1132, the configuration of FIG. 10 takes eight light measurements. The configuration of FIG. 9 takes one light measurement during a similar time. Therefore, because SLM 1000 has eight reset groups, the configuration of FIGS. 10 and 11 is approximately eight times faster than the configuration of FIGS. 7-9. Available SLM configurations include as many as 16 reset groups. The configuration of FIGS. 10 and 11 takes the number of measurements equal to the number of reset groups in the time that the configuration of FIGS. 7-9 takes one measurement.

FIG. 11 also shows the next cycle where compound reset signals 1136, 1140, 1144, 1148, 1152, 1156, 1160 and 1164 follow loading data 1134, 1138, 1142, 1146, 1150, 1154, 1158 and 1162, respectively. In addition, although there is a one in both data 1102 and 1134, data 1102 can be different from data 1134 in most configurations. The frequencies of interest often illuminate a narrower part of SLM 1000 than an entire reset group. Therefore, data 1102 can target a subgroup of the reset group directed to a subportion of the light spectrum having light frequency with a dominant color in one portion of the first reset group and data 1134 can target another subgroup of the reset group directed to a subportion of the light spectrum having frequency with another dominant color in another part of the first reset group. However, to provide the same resolution, the configuration of FIGS. 7-9 writes the entire SLM with a pattern directed to the band addressed by data 1102. Then the configuration of FIGS. 7-9 writes the entire SLM with a pattern directed to the band addressed by data 1134. Therefore, a higher resolution increases the number of patterns written in the configuration of FIGS. 7-9 by the same factor that it increases the number of reset group patterns in the configuration of FIGS. 10 and 11. Thus, for any given frequency resolution, the configuration of FIGS. 10 and 11 takes measurements approximately n times faster than the configuration of FIGS. 7-9, where n is the number of reset groups in the SLM.

Figure 12:
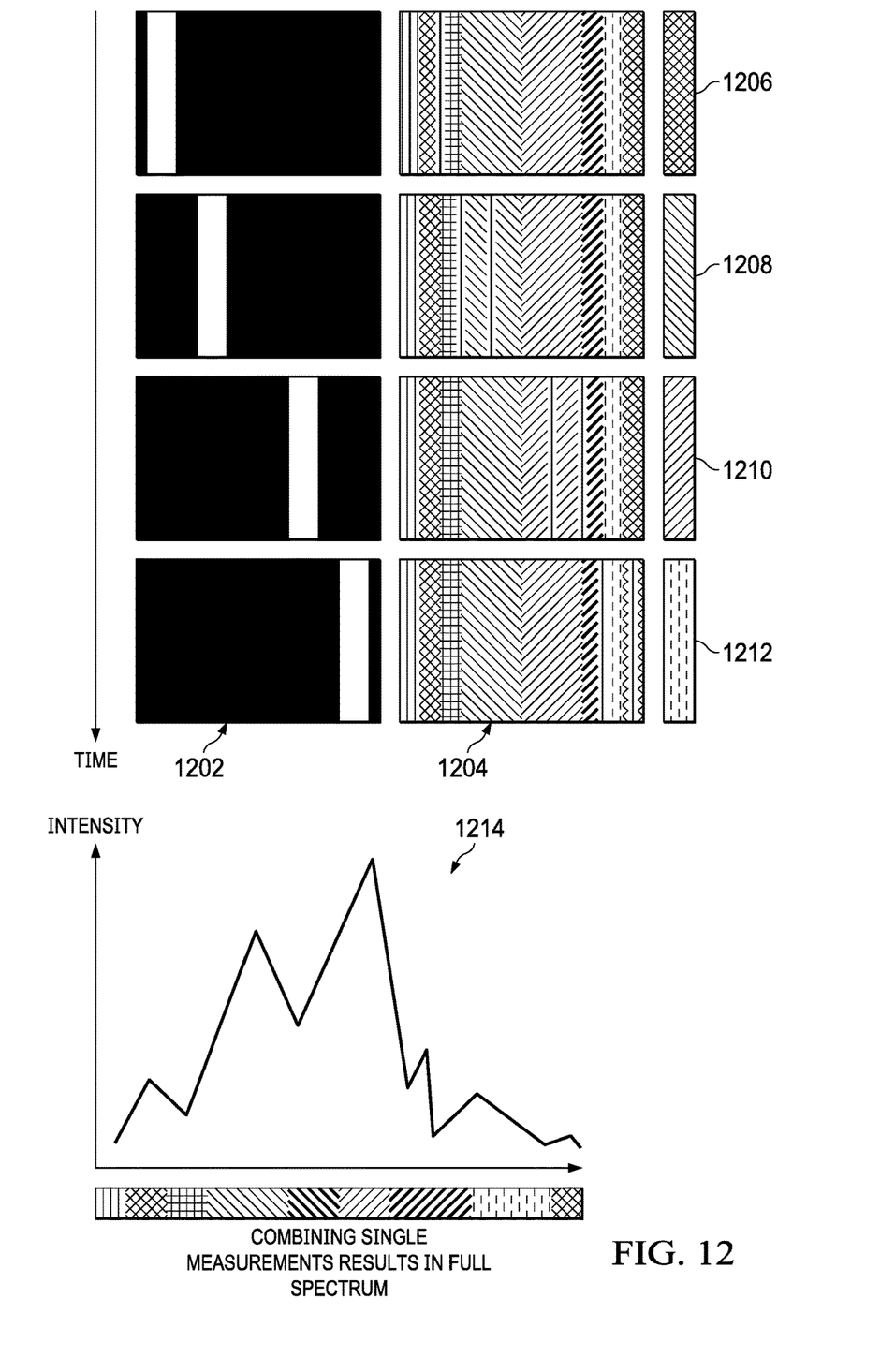
FIG. 12 is a diagram illustrating a method for extracting the light intensity of specific colors.

FIG. 12 is a diagram illustrating a method for extracting the light intensity of specific colors. Patterns 1202 are successively received by SLM 1000. Spectrums 1204 show where the "on" pattern (which is the portion of the pattern where the micromirrors of the SLM reflect the light impacting those mirrors to output optics for measurement of the light intensity, such as via lens 120 to photodetector 122 of FIG. 1). In the examples of FIG. 12, the first pattern transmits orange bar 1206, which is the portion of the light spectrum in which the dominant color is orange, to the photodetector, the second pattern transmits green bar 1208, which is the portion of the light spectrum in which the dominant color is green, to the photodetector, the third pattern transmits the blue bar 1210, which is the portion of the light spectrum in which the dominant color is blue, to the photodetector, and the fourth pattern transmits the violet bar 1212, which is the portion of the light spectrum in which the dominant color is violet, to the photodetector. Spectral graph 1214 shows the measurements of the bars on the color spectrum graphically. A graph like spectral graph 1214 uses many more than four measurements. For ease of explanation, patterns 1202 and spectrums 1204 are a simplification. A practical example could include hundreds of pattern bars and measurements.

Figure 13:
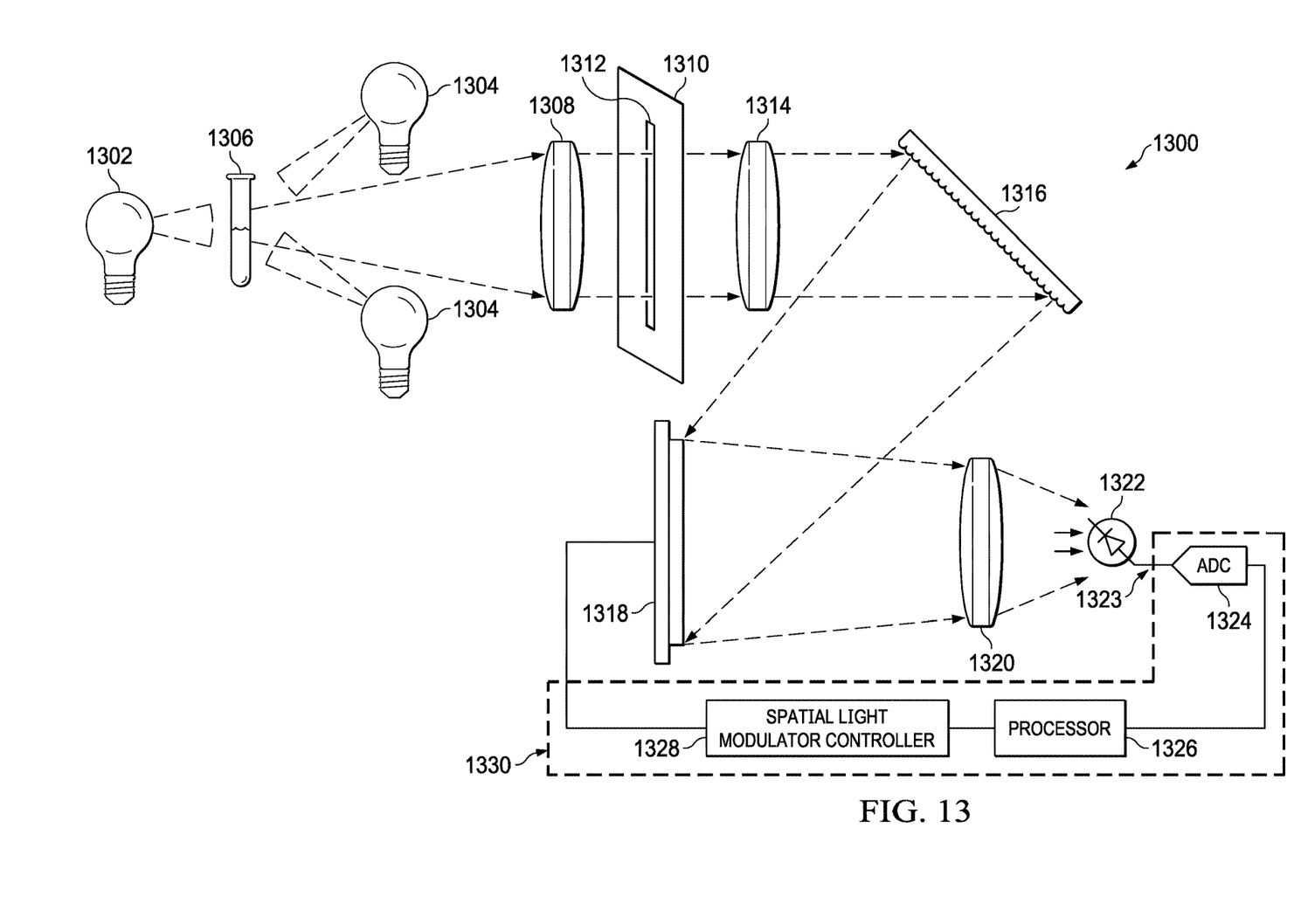
FIG. 13 is a schematic diagram of an example spectroscope including control circuitry.

FIG. 13 is a schematic diagram of an example spectroscope apparatus including control circuitry. Spectroscope 1300 includes light sources 1302 or 1304 that shine broad spectrum light through or off, respectively, test object 1306. Lens 1308 collimates the light that passes through slit 1312 in plate 1310. The light through slit 1312 is re-collimated by lens 1314 and reflected off diffraction grating 1316, which serves as a spectrum dispersion device that divides the light into its spectral components. SLM 1318 selectively reflects portions of the light spectrum to lens 1320, which focuses the light on photodetector 1322. Analog-to-digital converter (ADC) 1324 receives the light intensity signal from photodetector 1322 via input 1323 and converts the output of photodetector 1322 from an analog signal to a digital signal. Processor 1326 stores and processes the output of ADC 1324 to provide an output like spectral graph 1214 (FIG. 12). Processor 1326 also controls spatial light modulator (SLM) controller 1328. SLM controller 1328 controls the operation of SLM 1318, such as loading patterns onto SLM 1318 and providing reset signals for the appropriate reset group. In an example, SLM 1318 is a digital micromirror device (DMD) and SLM controller 1328 is a DMD controller.

As described hereinabove, SLM 1318 can be a digital micromirror device (DMD) or another type of spatial light modulator. ADC 1324, processor 1326 and SLM controller 1328 can be implemented as separate integrated circuits, can be on one combined integrated circuit 1330, or can be in a hybrid package including the three components in combinations of integrated circuits. Examples of processor 1326 include a microprocessor, microcontroller, digital signal processor (DSP), application specific integrated circuit (ASIC), field programmable gate array (FPGA) or other suitable integrated circuit (e.g., processing device). A prism is an alternative spectrum dispersion device to diffraction grating 1316 for separating the light from lens 1314 into spectral components. Photodetector 1322 can be a photodiode. Light sources 1302 and 1304 can be any number of broad spectrum light sources, and can provide visible, infrared or ultraviolet light, or combinations thereof. In addition, an ideal output of light sources provides equal light output for all relevant frequencies. However, practical light sources rarely have an ideal output. Therefore, processor 1326 adjusts the signal provided by ADC 1324 to compensate for frequency to frequency output anomalies of light sources 1302 and 1304. Also, processor 1326 can execute instructions for periodically measuring the output light of sources 1302 and 1304 and altering the spectral anomaly adjustment procedure to address operational effects on the light sources 1302 and 1304, such as aging.

Figure 14:
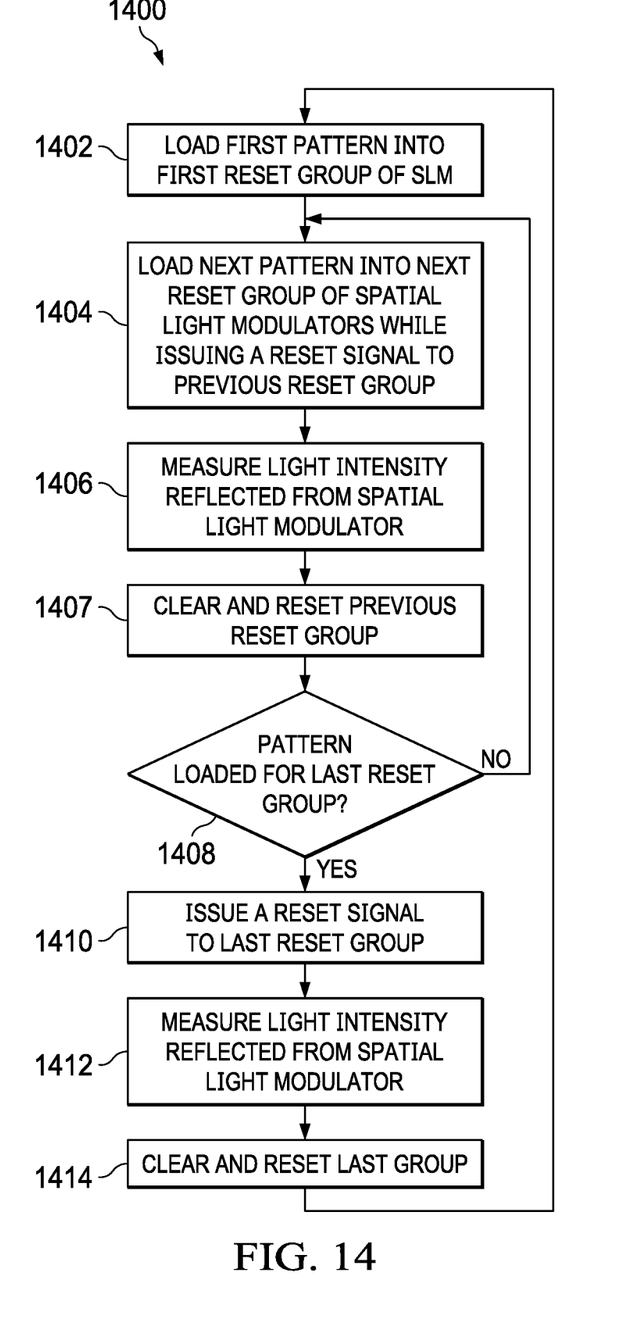
FIG. 14 is a flow diagram of an example method.

FIG. 14 is a flow diagram of an example method. Method 1400 begins with step 1402. Step 1402 loads a first pattern into a first reset group, like reset group 1002 (FIG. 10). The pattern may be like patterns 1202 (FIG. 12). Step 1404 loads a next pattern into the next reset group while applying a reset signal to the previous reset group, in this case the first reset group. Step 1406 measures the light reflecting from an SLM like SLM 1318 (FIG. 13) in response to the reset signal applied in step 1404. Step 1407 clears and resets the previous reset group. Step 1408 determines if step 1404 loaded the pattern for the last reset group. If not, the method returns to step 1404. If so, step 1410 issues a reset signal for the last reset group. Step 1412 measures the light intensity reflected from the SLM by the last reset group. Step 1414 clears and resets the last reset group and returns to step 1402.

Modifications are possible in the described examples, and other examples are possible, within the scope of the claims.

What is claimed is:

1. A system comprising:
a spatial light modulator having a first pixel group, a second pixel group, a third pixel group, and a fourth pixel group; and
a controller coupled to the spatial light modulator, the controller configured to:
during a first time period, load a first pattern to the first pixel group;
during a second time period:
load a second pattern to the second pixel group;
apply a first reset signal to the first pixel group;
apply a clear signal to the third pixel group, the clear signal configured to instruct the spatial light modulator to clear the third pixel group; and
apply a second reset signal to the third pixel group after sending the clear signal; and
during a third time period:
load a third pattern to the fourth pixel group;
apply a third reset signal to the second pixel group;
apply a third clear signal to the first pixel group; and
apply a fourth reset signal to the first pixel group after applying the third clear signal.

2. The system of claim 1, wherein the first pixel group is configured to receive first light having a first frequency range and modulate the first light, to produce first modulated light;
wherein the second pixel group is configured to receive second light having a second frequency range and modulate the second light to produce second modulated light;
wherein the third pixel group is configured to receive third light having a third frequency range and modulate the third light to produce third modulated light; and
wherein the fourth pixel group is configured to receive fourth light having a fourth frequency range and modulate the fourth light to produce fourth modulated light.

3. The system of claim 2, further comprising a photodetector optically coupled to the spatial light modulator, wherein:
the first pixel group is configured to direct the first modulated light to the photodetector after receiving the first reset signal, while the second pixel group is directing the second modulated light away from the photodetector; and
the second pixel group is configured to direct the second modulated light to the photodetector after receiving the third reset signal, while the first pixel group is directing the first modulated light away from the photodetector.

4. The system of claim 1, wherein the first pixel group is configured to receive first light having a first frequency range and modulate the first light, to produce first modulated light; and
wherein the second pixel group is configured to receive second light having a second frequency range and modulate the second light to produce second modulated light, the second frequency range different from the first frequency range.

5. The system of claim 4, further comprising a photodetector optically coupled to the spatial light modulator, wherein the spatial light modulator is configured to direct the first modulated light to the photodetector after receiving the first reset signal.

6. The system of claim 5, further comprising an analog-to-digital converter coupled to the photodetector.

7. The system of claim 6, further comprising a processor coupled to the analog-to-digital converter and to the controller.

8. The system of claim 7, wherein the analog-to-digital converter, the controller, and the processor are in an integrated circuit.

9. The system of claim 7, wherein the processor is configured to produce a spectral graph responsive to receiving signals from the analog-to-digital converter.

10. The system of claim 1, wherein the spatial light modulator is a digital micromirror device.

11. The system of claim 1, further comprising a diffraction grating optically coupled to the spatial light modulator.

12. The system of claim 11, further comprising a plate having a slit, the plate optically coupled to the diffraction grating.

13. The system of claim 1, further comprising a prism optically coupled to the spatial light modulator.

14. A method comprising:
during a first time period, loading, by a controller, a first pattern to a first pixel group of a spatial light modulator;
during a second time period:
loading, by the controller, a second pattern to a second pixel group of the spatial light modulator;

applying a first reset signal to the first pixel group, wherein the second time period is after the first time period;

applying a first clear signal to a third pixel group, the first clear signal configured to instruct the spatial light modulator to clear the third pixel group; and applying a second reset signal to the third pixel group after sending the first clear signal; and during a third time period:

loading a third pattern to a fourth pixel group;

applying a third reset signal to the second pixel group;

applying a second clear signal to the first pixel group; and applying a fourth reset signal to the first pixel group after applying the second clear signal.

15. The method of claim 14, further comprising:

receiving, by the first pixel group, first light having a first frequency range modulating, by the first pixel group, the first light, to produce first modulated light;

receiving, by the second pixel group, second light having a second frequency range;

modulating, by the second pixel group, the second light to produce second modulated light;

receiving, by the third pixel group, third light having a third frequency range;

modulating, by the third pixel group, the third light to produce third modulated light;

receiving, by the fourth pixel group, fourth light having a fourth frequency range; and modulating, by the fourth pixel group, the fourth light to produce fourth modulated light.

16. The method of claim 15, further comprising:

directing, by the spatial light modulator, the first modulated light to a photodetector after receiving the first reset signal, while directing the second modulated light away from the photodetector; and directing, by the spatial light modulator, the second modulated light to the photodetector after receiving the third reset signal, while directing the first modulated light away from the photodetector.

17. A system comprising:

a spatial light modulator having a first pixel group and a second pixel group;

a photodetector optically coupled to the spatial light modulator; and a controller coupled to the spatial light modulator, the controller configured to:

during a first time period, load a first pattern to the first pixel group;

during a second time period:

load a second pattern to the second pixel group;

apply a first reset signal to the first pixel group; and wherein the first pixel group is configured to:

receive first light having a first frequency range and modulate the first light, to produce first modulated light; and direct the first modulated light towards the photodetector after receiving the first reset signal, while the second pixel group is directing second modulated light away from the photodetector; and wherein the second pixel group is configured to:

receive second light having a second frequency range and modulate the second light to produce the second modulated light; and direct the second modulated light to the photodetector, while the first pixel group is directing the first modulated light away from the photodetector.

18. The system of claim 17, wherein the spatial light modulator further has a third pixel group and a fourth pixel group, and wherein during a third time period the controller is further configured to:

load a third pattern to the fourth pixel group;

apply a third reset signal to the second pixel group;

apply a third clear signal to the first pixel group; and apply a fourth reset signal to the first pixel group after applying the third clear signal.

19. The system of claim 18, wherein the controller is further configured to:

apply a clear signal to the third pixel group, the clear signal configured to instruct the spatial light modulator to clear the third pixel group; and apply a second reset signal to the third pixel group after sending the clear signal.

* * * * *